D. S. BIGLER.
Horse Hay Fork.
No. 90,149.
Patented May 18, 1869.
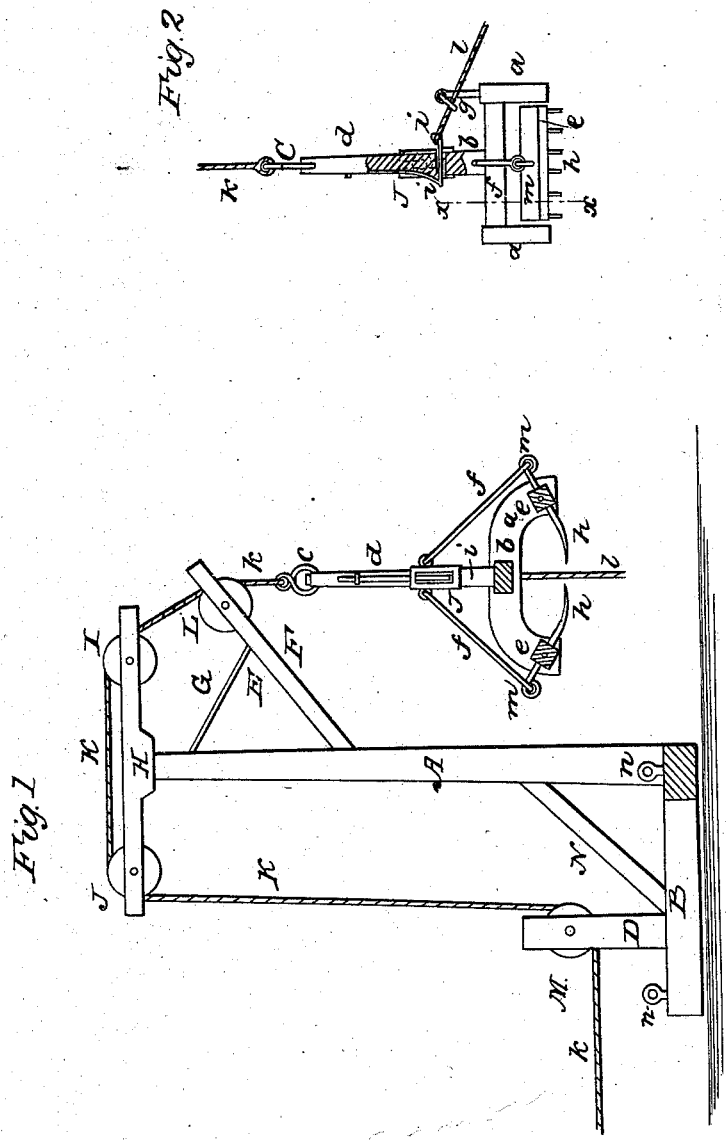
Witnesses
Wm A Magan
G C Cotton
Inventor
Dan'l S Bigler
per Munn & Co
attorneys

United States Patent Office.

DANIEL S. BIGLER, OF SIDDONSTOWN, PENNSYLVANIA.

Letters Patent No. 90,149, dated May 18, 1869.

---

IMPROVEMENT IN HORSE HAY-FORKS.

---

The Schedule referred to in these Letters Patent and making part of the same.

---

*To all whom it may concern:*

Be it known that I, DANIEL S. BIGLER, of Siddonstown, in the county of York, and State of Pennsylvania, have invented a new and useful Improvement in Hay and Manure-Loaders; and I do hereby declare that the following is a full, clear, and exact description thereof, which will enable others skilled in the art to make and use the same, reference being had to the accompanying drawings, forming part of this specification, in which—

Figure 1 is a side elevation of my invention, with a sectional view of the fork-frame, the section of which is taken through the line $x\ x$ of fig. 2.

Figure 2 is a detail view of the fork-apparatus.

Similar letters of reference indicate like parts.

The object of this invention is to provide a simple and effective machine for loading hay or manure from the stack or manure-pile.

It consists of the mechanism as herein set forth.

In the drawings—

A is a derrick-post, or upright, rising from the cross-beams B and C, which serve as a base for the post A.

D is an upright from the beam B, and bears a sheave, M.

E is a bracket, strengthened by a brace, G.

This bracket bears a sheave, L.

H is a derrick-beam surmounting the post A, and bearing the sheaves I and J, one on each side of the said post.

The rope K, which lifts the fork-apparatus, passes over the sheave L I J, and down and under the sheave M, and from thence extends along horizontally, terminating in a single-tree, to which the draught-animal is hitched.

The frame of the fork-apparatus consists of the side-pieces $a\ a$, united by a cross-piece, $b$, from which rises an upright, $d$, terminating in a link, $c$, to which the rope $k$ is attached.

The ends of the said side-pieces are turned down to furnish suitable bearings for the rocking fork-heads $e\ e$, the ends of which are reduced or pivoted with metal gudgeons, which, resting in holes in the ends of the side-pieces, enable the said heads $b$ to rock, or open and close the tines $h\ h$.

On the upright, $d$, slides a runner, $j$, of metal preferably, which is connected, by rods $f\ f$, to the eye-bolts, or arms $m\ m$, arising from the upper side of the heads $e$.

The rods $f\ f$ are loosely attached at either end, so that when the runner $j$ is moved up or down, the tines $h$ will be opened or closed respectively.

A spring-catch, $i$, resembling an umbrella-catch in its operation, is arranged to spring out through a slot in the runner, and lock the same at the point where lines are pointed toward each other or closed, as shown.

The horizontal part of the catch passes through a slot or hole in the upright, $d$, as shown, and is connected with a tripping-line, $l$, running through a ring, $g$, suitably located on the side-piece $a$ of that side.

In operation, the apparatus is set up near the haystack or manure-pile, leaving sufficient space between for the wagon to pass.

The base-beams are affixed to the ground by iron stakes, or rods $n$ passing through them, near the ends. A horse is hitched to the end of the rope K, and the fork-frame lowered into the hay-stack or pile. The tines are opened and thrust into the substance, when the runner is slid down, pushing the tines to the position shown in the drawing, in which position they grasp a quantity of the hay or manure, and hold it, for the catch $i$ having entered the slot, the runner is immovable. The horse is then driven forward, and the hay or manure is raised to the requisite height to clear the wagon. The fork-apparatus is then swung over the wagon, and the tripping-line $l$ pulled, which liberates the tines, allowing them to open and discharge the hay or manure therefrom.

I desire to be understood as not limiting the use of the fork-apparatus to its combination with the derrick-apparatus, for it may be used in connection with other mechanism, or the rope K may pass over a pulley attached to a rafter, and thus be used for unloading hay.

Having thus described my invention,

I claim as new, and desire to secure by Letters Patent—

The fork-head, constructed, as described, of the curved side-pieces $a\ a$, united by the cross-piece $b$, the rocking fork-heads $e$, carrying the tines $h$, the slotted upright $d$, rods $f$, slotted runner $j$, and spring-catch $i$, all arranged and operating as described, for the purpose specified.

DANIEL S. BIGLER.

Witnesses:
JOHN KERNAN,
WILLIAM MYERS.